United States Patent [19]

Parker

[11] Patent Number: 4,816,185

[45] Date of Patent: Mar. 28, 1989

[54] STYRENE ALKYLBENZENE COPOLYMERS AND SULFONATES THEREOF AND METHOD OF MAKING

[75] Inventor: Phillip H. Parker, San Rafael, Calif.

[73] Assignee: Chevron Research Company, San Francisco, Calif.

[21] Appl. No.: 21,896

[22] Filed: Mar. 4, 1987

[51] Int. Cl.[4] .................................................. C11D 1/12
[52] U.S. Cl. .............................. 252/549; 252/174.23; 252/558; 252/DIG. 2; 260/505 C; 260/505 R
[58] Field of Search ................... 252/549, 558, 174.23, 252/DIG. 2; 260/505 C, 505 R; 525/333.5

[56] References Cited

U.S. PATENT DOCUMENTS

| | | | |
|---|---|---|---|
| 3,499,052 | 3/1970 | Young et al. | 260/669 |
| 3,686,339 | 8/1972 | Schecker et al. | 260/668 F |
| 3,691,244 | 9/1972 | Koehler et al. | 260/668 F |
| 3,721,707 | 3/1973 | Straus et al. | 260/513 |
| 3,723,555 | 3/1973 | Armbrust et al. | 260/668 F |
| 3,830,863 | 8/1974 | Armbrust et al. | 260/668 F |
| 3,860,667 | 1/1975 | Rutledge | 260/668 F |
| 4,052,473 | 10/1977 | Yagi et al. | 260/669 P |
| 4,054,612 | 10/1977 | Yagi et al. | 260/669 P |
| 4,604,233 | 8/1986 | Rootsaert | 252/558 |
| 4,692,276 | 9/1987 | Schramm | 252/545 |

FOREIGN PATENT DOCUMENTS 977322 12/1964 United Kingdom .

*Primary Examiner*—John F. Niebling
*Assistant Examiner*—Isabelle Rodríguez
*Attorney, Agent, or Firm*—S. R. La Paglia; R. C. Gaffney; L. S. Squires

[57] ABSTRACT

Reaction products of $C_9$–$C_{30}$ alkylbenzenes with styrene and sulfonated derivatives thereof and processes for preparing such products and derivatives. The sulfonate salts of reaction products are especially useful as detergents.

32 Claims, No Drawings

STYRENE ALKYLBENZENE COPOLYMERS AND SULFONATES THEREOF AND METHOD OF MAKING

BACKGROUND OF THE INVENTION

The present invention relates to copolymers of higher alkylbenzenes with styrene and to sulfonated derivatives thereof, and to methods of preparing such copolymers and derivatives. In a further aspect the invention relates to detergent compositions and intermediates therefor.

Hydrocarbon surfactants are useful for a variety of commercial applications such as detergents, plasticizers and enhanced oil recovery foaming agents. For detergent applications, it is important that the compound exhibit good foaming properties, water solubility and biodegradability. One of the leading detergents used today is a mixture of long chain alkylbenzene sulfonates. Such, compounds exhibit very good washing properties and adequate solubility properties. It would be desirable to improve the solubility of such detergents, thus improving their cold-water washing ability and in the case of liquid detergents, permitting the concentration of active detergent in the liquid detergent to be increased, thus reducing the weight and increasing ease of handling a given amount of active detergent.

A variety of hydrocarbon surfactants have been described by the patent literature. Thus, for example, U.S. Pat. No. 3,499,052 describes the preparation of copolymers of styrene and an alpha-olefin. U.S. Pat. Nos. 4,052,473 and 4,054,612 are directed to processes for conjugated dienes with aromatic vinyl compounds including styrene. U.S. Pat. No. 3,721,707 describes the preparation of organic sulfonic acid oligomers and U.S. Pat. No. 3,803,524 generally describes a process for preparing a chain oligomer from a vinyl aromatic compound and/or an alpha-olefin or derivatives thereof. British Pat. No. 977,322 is directed to the preparation of certain cycloalkyl terminated styrene copolymers. Processes for manufacturing 1-methyl-3-phenylindanes are described in U.S. Pat. Nos. D3,686,339; 3,691,244; 3,723,555; 3,830,863; and 3,860,667. 1-Methyl-3-phenylindane is described in these patents as being a useful starting material for the preparation of dyes and pesticides.

SUMMARY OF THE INVENTION

The present process provides copolymers of $C_9$–$C_{30}$ alkylbenzenes with styrene and sulfonates of such copolymers and mixtures comprising such compounds. The sulfonates possess excellent foaming properties and water solubility and good biodegradability and provide excellent detergents. The high water solubility of the present sulfonates renders them especially useful as liquid detergents.

The present invention provides compounds having the formula:

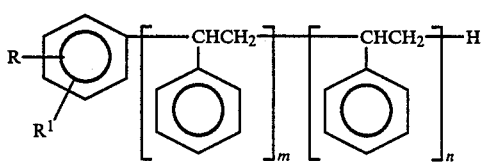

wherein m and n are independently a whole integer of from 1–10; and one of R or $R^1$ is hydrogen or alkyl having 9–30 carbon atoms, preferably 10 to 18, and the other is alkyl having 9–30 carbon atoms, preferably 10 to 18 carbon atoms.

In a further aspect, the invention provides compounds having the formula:

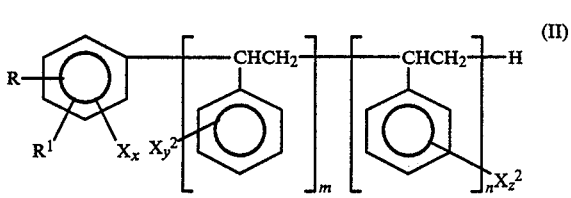

wherein X, $X^1$ and $X^2$ are independently selected from radicals having the formula $-SO_3M$ wherein M is hydrogen or a detergent acceptable cation and y and z are independently 0 or a whole integer of 1–10, and represent the number of $-SO_3M$ units in the polymer units m and n, respectively and wherein said $-SO_3M$ units are attached to the phenyl rings in said polymer units with the proviso that no more than one $-SO_3M$ group is attached to a single phenyl ring; one of R or $R^1$ is alkyl having 9–30 carbon atoms and the other is hydrogen or alkyl having 9–30 carbon atoms and x is 0 or 1 with the proviso that the sum of x, y and z is at least one.

In another aspect, the invention comprises a composition containing one or more compounds according to Formula I hereinabove and one or more alkylbenzenes selected from the group of alkylbenzenes having one or two alkyl substituents having 9–30 carbon atoms and/or one or more compounds having the formula:

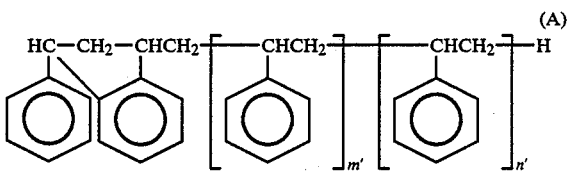

wherein m' and n' are independently 0 or a whole integer of from 1–10.

In a further aspect the invention comprises a mixture comprising one or more compounds according to Formula A above and one or more alkylbenzenes having one or two alkyl substituents having 9–30 carbon atoms.

The above mixtures are especially useful as an intermediate for detergents.

In a further aspect, the invention comprises a composition, or the sulfonic acid precursor thereto, containing one or more compounds according to Formula II hereinabove and one or more sulfonated alkylbenzenes salt having 1 or 2 alkyl substituents independently selected from the group of alkyl having 9 to 30 carbon atoms and a $-SO_3M$ substituent on the benzene ring, wherein M is hydrogen or a detergent acceptable cation and/or one or more compounds having the formula:

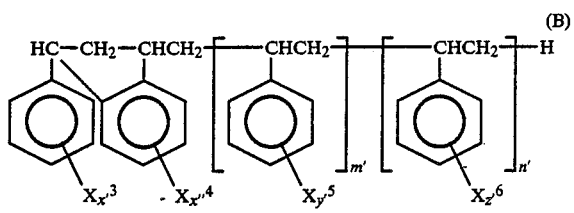

(B)

wherein m' and n' are independently 0 or a whole integer of from 1-10; X, $X^3$, $X^4$, $X^5$ and $X^6$ are independently —$SO_3M$ wherein M is hydrogen or a detergent acceptable cation; y' and z' represent the number of —$SO_3M$ units in the polymer unit m' and n' respectively and independently are 0 or a whole integer of from 1-10, with the proviso that the number of —$SO_3M$ substituents on any phenyl ring is 0 or 1; x' and x" are independently 0 or 1; and the sum of y', z', x' and x" is at least 1.

The invention also provides detergent compositions and the sulfonic acid precursors thereto, which compositions comprise one or more compounds according to Formula A hereinabove and one or more alkylbenzenes having one or two alkyl substituents having 9 to 30 carbon atoms.

The present invention also provides a process for preparing a novel $C_9$–$C_{30}$ alkylbenzene copolymers and the aforedescribed mixtures which comprises contacting $C_9$–$C_{30}$ alkylbenzene with styrene in the presence of a catalytic amount of a suitable hydrogen proton catalyst under polymerization conditions. The invention also provides a process for preparing the sulfonated detergents described above which comprises contacting a $C_9$–$C_{30}$ alkylbenzene copolymer or the appropriate mixture described above with a sulfonating agent (e.g., sulfur trioxide) under reactive conditions followed by neutralization with a base to afford the M cation salt. In a still further aspect, the invention comprises the polymer product and sulfonated polymer products prepared by the aforedescribed processes.

The invention will be further described hereinbelow.

FURTHER DESCRIPTION OF THE INVENTION

In one embodiment, the polymer intermediate composition provided by the present invention typically comprises about from 20-90 weight percent, preferably 40-70 weight percent, of one or more polymers according to Formula I and about 10-80 weight percent, preferably 30-60 weight percent of $C_9$–$C_{30}$ alkylbenzene(s). In another embodiment, the polymer intermediate composition typically comprises about 30-80 weight percent, preferably 40-70 weight percent of the polymer(s) of Formula I and about 20-70 weight percent, preferably 30-60 weight percent of the compound(s) of Formula A. In the case where the mixture is prepared to contain all three compounds, the mixture typically contains about 30-70 weight percent, preferably 40-70 weight percent, of the polymer(s) of Formula I, about from 10-50 weight percent, preferably 15-30 weight percent, $C_9$–$C_{30}$ alkylbenzene, and 10-40 weight percent, preferably 15-30 weight percent of the compounds of Formula A. In a further embodiment, the intermediate mixture comprises about 20-80 weight percent, preferably 30-70 weight percent of a compound(s) according to Formula A and about 20-80 weight percent, preferably 30-70 weight percent of the alkylbenzenes.

The detergent compositions of the present invention comprise the cpolymers salts of Formula II (i.e., M is a detergent acceptable cation) individually or in mixture with fillers or builders and/or various additives or other detergent materials. The invention also provides a number of mixtures of detergent sulfonates generally representing the sulfonated salts of the previously described intermediate mixtures. Such detergents include the following detergent mixtures:

(a) mixtures typically comprising about from 20-90 weight percent, preferably 40-70 weight percent of the sulfonate salts of Formula II and 10-80 weight percent, preferably 30-60 weight percent of a detergent alkylbenzene sulfonate salt(s) as defined hereinbelow;

(b) mixtures typically comprising about 30-80 weight percent, preferably 40-70 weight percent of the sulfonate salts of Formula II and about 20-70 weight percent, preferably 30-60 weight percent of the sulfonate salts of Formula B;

(c) mixtures typically comprising about 30-80 weight percent, preferably 40-70 weight percent of the sulfonate salt of Formula I; about 10-50 weight percent, preferably 15-30 weight percent of detergent alkylbenzene sulfonate salt(s) and about 10-40 weight percent, preferably 15-30 weight percent of the sulfonate salt(s) of formula B; and (d) mixtures typically comprising about from 20-80 weight percent, preferably 30-70 weight percent of the sulfonate salt(s) of Formula B and about from 20-80 weight percent, preferably 30-70 weight percent of detergent alkylbenzene sulfonate salt(s).

In terms of solubility, the detergent products of the present invention, especially the salts of Formula I and the mixtures of groups (a), (b) and (c) above, typically have a solubility clear point significantly lower than the sulfonates of the corresponding alkylbenzene used to prepare the present detergents and further have excellent cleaning properties. The detergent composition can also contain various additives non-caking agents and soluble builders, such as are suitably used in detergents, for example, sodium tripolyphosphate, zeolites, sodium silicate, sodium carboxymethylcellulose, sodium sulfate, etc. In some instances additives are used to soften hard water or buffer the washing solution and prevent soil redeposition on fabric.

In preparing the polymers of the present invention, generally commercial alkylbenzenes are used. Thus, in most cases the product will be a mixture of polymers terminated with different alkylphenyls as well as, in some instances, 3-phenylindanylmethyl. The polymers also generally vary as to chain length. In general, there is no need to separate out any particular polymers, since for most commercial purposes the mixture is adequate and may indeed have certain advantages in that the mixture can provide an interaction of desirable properties. For instance, where the mixture is used to prepare a detergent, one component may provide excellent surfactant action whereas another may provide excellent solubility.

Where monoalkylbenzenes are used as the starting material, attachment of the terminating alkylbenzene will typically be at the para position of the benzene ring relative to the alkyl group with a small amount at the ortho position.

In terms of detergent properties, e.g., water solubility, foaming and biodegradability, the preferred copolymers and sulfonates are those wherein one of R or $R^1$ is hydrogen and the other is an alkyl group having 10 to 18 carbon atoms and for biodegradability considerations, R is more preferably a linear or monobranched alkyl group. It should also be appreciated that although m or n are whole numbers, indicative of a single compound, in actual practice that product is generally a mixture of such compounds and can be characterized by an overall or average m or n number which can be a fraction. In terms of the mixture, it has been found that product mixtures having an m+n value in the range of 1 to 5 with a total of about from 2 to 5 sulfonate units in the polymer and an average $C_{10}$–$C_{14}$ alkylbenzene terminating group, especially $C_{12}$ alkylbenzene, have especially good detergent properties. The optimum number of sulfonate groups in the polymer is influenced by the alkyl moiety of the alkylbenzene terminating group as well as the size of the copolymer. Thus, where higher alkylbenzenes are used, it is desirable to increase the amount of sulfonate groups to maintain what is referred to in surfactants as the hydrophile-lipophile balance ("HLB"). The alkyl moiety is the lipophile whereas the sulfonate group is the hydrophile. Hence, where the copolymer has a higher alkylbenzene terminating group, the lipophilicity of the copolymer is increased and desirably should be balanced with increased sulfonate groups, to maintain the hydrophile-lipophile balance and for detergent use, the desired water solubility.

The particular M cation is typically selected on the basis of cost and environmental acceptability and on this basis as well as giving good results M is preferably sodium. Also, in theory, mixed polymer salts can be prepared by neutralizing the sulfonic acid precursor (i.e., Formula II M=H) with mixed bases or conducting partial neutralizations using different bases or by ion exchange. In practice, the sulfonic acid precursor will be simply neutralized with sodium hydroxide or the like.

The copolymers of formula (I) can be prepared by contacting styrene with the appropriate $C_9$–$C_{30}$ alkylbenzene or di($C_9$–$C_{30}$ alkyl)benzene mixture in the presence of an acid catalyst under polymerization conditions. Suitable catalysts which can be used include, for example, sulfuric acid, trifluoromethane sulfonic acid and aluminum chloride. Typically, the polymerization is conducted at temperatures in the range of about from $-20°$ to $150°$ C., preferably $40°$ to $100°$ C. and pressures of about from $\frac{1}{2}$ to 5 atmospheres, preferably 1 to 2 atmospheres for about from $\frac{1}{4}$ to 20 hours, preferably 1 to 4 hours. Typically about from 0.2 to 5 moles of styrene is used per mole of alkylbenzene depending upon the ratio of styrene units to alkylbenzene units desired in the polymer product. As before mentioned, in the typical case, where commercial or industrial $C_9$–$C_{30}$ alkylbenzenes are used as starting material, they contain a mixture of alkylbenzene isomers having different branching as well as higher or lower alkylbenzenes. Correspondingly, the copolymer product wll also typically be a mixture of copolymers which can contain variations in the alkylbenzene terminating moiety as well as in the number of styrene units in the polymer chain.

The reaction product mixture is typically a mixture of polymers of Formula I and varying amounts of unreacted alkylbenzene and byproducts indicated by formula A hereinabove. (Generally, styrene is essentially consumed in the reaction, and thus typically is not found in significant amounts in the reaction products.)

Since the sulfonate salts of both the byproduct (A) and the unreacted alkylbenzenes also possess good detergent properties, the presence of byproduct and unreacted alkylbenzene is not objectionable where the product is intended for detergent uses. The formation of byproduct (A) is affected by the particular catalyst used for the polymerization. The use of sulfuric acid or trifluoromethylsulfonic acid as the catalyst enhances the formation of the compounds of Formula I and reduces the amount of byproduct A. If for some reason it is desired to commercially obtain relatively pure polymers of Formula I, these can be obtained by using sulfuric acid or trifluoromethylsulfonic acid as the catalyst and using a single alkylbenzene or narrow range alkylbenzene mixture instead of a broader range alkylbenzene mixture and then separating the reaction product mixture by fractional distillation after first neutralizing the acid catalyst.

On the other hand, it has been found that the use of phosphoric acid as the catalyst is highly selective to the formation of the compound(s) of Formula A and generally does not produce any significant if any, amounts of the compounds of Formula I. Thus, by using phosphoric acid as the catalyst in the aforedescribed polymerization process, the reaction product mixture is a mixture of compounds of Formula A and unreacted alkylbenzene. Generally, no significant amounts of styrene are present; as under the above-specified reaction conditions, the styrene is essentially consumed in the polymerization. The reaction product mixtures produced by this process can also be sulfonated directly to produce a high quality biodegradable detergent.

The sulfonation step can be conducted by contacting the copolymer of Formula I or the reaction product mixtures with a sulfonating agent, either neat or in an inert organic solvent under reactive conditions. The reaction product mixture can be sulfonated in situ or if desired, unreacted alkylbenzenes and higher polymers, etc. can be removed prior to sulfonation, for example, by neutralizing the acid catalyst with base and fractionally distilling the reaction mixture. In any case, where it is desired to use the product to prepare detergents, the reaction mixture can be used directly without separation of the byproduct (A) or alkylbenzene, since, as before mentioned, both the byproduct and alkylbenzene sulfonate salts and 1-methyl-3-phenylindane sulfonate salts (Formula B) possess good detergent properties and as noted above, the mixtures can actually enhance overall detergent properties.

The sulfonation reaction can also be conducted in the presence of a moderating agent, such as dioxane. The dioxane complexes with the sulfonating agent (e.g., sulfur trioxide), thus moderating the speed or intensity of the reaction. The sulfonation is typically conducted at temperatures in the range of about from $-40°$ to $100°$ C., preferably $0°$ to $50°$ C. for about from 1 to 20 hours, preferably 1 to 10 hours using pressures of about from $\frac{1}{2}$ to 5 atmospheres, preferably 1 to 2 atmospheres. Typically, about from 0.1 to 2, preferably about from 1 to 1.25 moles, based on sulfur, of sulfonating agent are used per mole of styrene and alkylbenzene used in the aforedescribed polymerization. (In most instances, any unreacted alkylbenzene and byproduct (A) are simply retained in the reaction mixture and sulfonated along with polymer I. In the event that unreacted alkylbenzene and/or byproduct (A) are removed prior to sulfonation, then the amount of sulfonated agent can be correspondingly reduced.) Sulfonation occurs at the phenyl ring of the reactants and essentially occurs at only at one position of the phenyl ring under the present conditions. The ratio of sulfonating agent to copolymer will vary with the degree of sulfonation desired which in turn will be a function of the particular copolymer as explained above.

Suitable sulfonating agents which can be used include, for example, sulfur trioxide, sulfuric acid, chlorosulfonic acid, acetylsulfate, and the like. Suitable inert organic solvents which can be used include, for example, methylene chloride, dichloroethane, trichloroethane, tetrachloroethane, and the like.

After sulfonation, the sulfonated product is neutralized preferably in situ with a suitable base yielding the corresponding salt. Typically, the neutralizaton is conducted at temperatures in the range of about from 0° to 60° C. and pressures of about from 1 to 2 atmospheres using about from 1 to 1.1 mole equivalents of base per mole equivalent of sulfonate in the copolymer. Suitable bases which can be used include, for example, alkali metal hydroxides, alkali earth hydroxides, ammonium hydroxides, quaternary ammonium hydroxides, amines, and the like. Generally, the selection of the base will be a matter of economics, and for this reason, sodium hydroxide is preferred because it gives good results and is relatively inexpensive. Suitable inert organic solvents include the same solvents as listed above with respect to the sulfonation.

General Process Conditions

The present processes can be conducted as a batch, semi-batch, or continuous process using suitable equipment such as are, for example, conventionally used in the polymer and detergent art.

It should be appreciated that where typical or preferred process conditions (e.g., temperatures, times, mole ratios, solvents, pressures, etc.) have been given, that typically other process conditions could also be used, unless otherwise stated, though generally less effectively. Optimum process conditions may vary with the particular reactants, catalyst, or solvents employed but can be determined by routine optimization procedures.

As before mentioned, the sulfonated copolymers of the present invention are especially useful as detergents, and because of their excellent solubility can be readily formulated with water to provide excellent high concentration liquid detergents.

Definitions

As used herein, the following terms have the following meanings unless expressly stated to the contrary.

The term "alkyl" refers to both straight-chain and branched-chain alkyl groups. Typical alkyl groups include, for example, methyl, ethyl, propyl, t-butyl, hexyl, isohexyl, octyl, decyl, undecyl, dodecyl, tridecyl, tetradecyl, pentadecyl, hexadecyl, heptadecyl, octadecyl, nonadecyl, 2-ethyldodecyl, 5-methyl-4-propyltetradecyl, eicosyl, tetracosyl, and the like.

The term "1-methyl-3-phenylindane" refers to the compound having the formula:

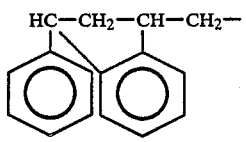

The term "3-phenylindanylmethyl" refers to the radical having the formula:

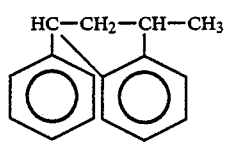

The term "detergent acceptable cation" refers to cation which form sulfate salts of Formula II or B which do not significantly adversely effect the detergent properties or toxicity of the compound.

The term "detergent alkylbenzene sulfonate salt(s)" refers to compound(s) having the formula:

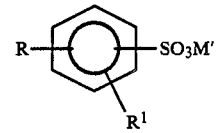

wherein M' is a detergent acceptable cation and one of R or $R^1$ is hydrogen or alkyl having 9–30 carbon atoms, preferably 11–18 carbon atoms and the other is alkyl having 9–30 carbon atoms, preferably 11–18 carbon atoms.

A further understanding of the invention can be had from the following non-limiting examples.

EXAMPLES

Example 1

Alkylbenzene-Styrene Copolymer

In this example, 7.26 g (0.03 mole) of mixed linear alkylbenzene with an average $C_{12}$ alkyl group, and 2 ml of aqueous 96 weight percent sulfuric acid was stirred at 100° C. under a nitrogen atmosphere. To this was added a mixture containing 7.26 g (0.03 mol) of the linear alkylbenzene mixture and 12.46 (0.12 mol) of styrene. The alkylbenzene-styrene mixture was added dropwise over a ½-hour period. The resulting mixture was stirred for an additional 3 hours at 100° C. and then treated with clay to remove color bodies. After removal of color bodies, the reaction product mixture, was used directly as starting material for Example 2 hereinbelow.

Example 2

In this example, 18 g (0.225 mole) of sulfur trioxide was added slowly to a stirred mixture containing 19.8 g (0.204 mole) of p-dioxane in 150 ml of methylene chloride at −5° C. to 5° C. under a nitrogen atmosphere. The mixture was stirred for ½ hour and then warmed to room temperature (about 20°–25° C.). 27 g (0.06 mole) of the copolymer reaction product of Example 1, in 100 ml of methylene chloride was slowly added to the sulfur trioxide-dioxane mixture over a 5-minute period. The mixture was maintained at 16°–25° C. for ½ hour and then warmed to room temperature (20°–25° C.) and stirred overnight (about 16 hours). The mixture was then stirred with 100 ml of water and then evaporated under vacuum to remove methylene chloride and dioxane and neutralized with aqueous 50 weight percent sodium hydroxide to form the sodium salt. A 10% portion of the mixture was freeze-dried to remove water producing the dried copolymers sulfonate as a powder. Total yield was 41.4 grams of sulfonated copolymer as the sodium salt having an average sulfate content of about one sulfonate radical per aromatic ring.

Example 3

In this example, a number of compositions according to the invention were prepared generally following the procedures described in Examples 1 and 2 hereinabove. The polymer reaction product contains a small amount of unreacted alkylbenzene. In each case the polymer reaction product was sulfonated in situ and neutralized. the sulfonated product was a mixture of sodium sulfonate polymers containing a small amount of sodium alkylbenzene sulfonate. The polymerization conditions are described in Table A hereinbelow. The sulfonation conditions and polymers expressed as an average are described in Table B hereinbelow.

TABLE A

| Comp. No. | Alkylbenzene | Mole Ratio alkylbenzene/ styrene | Reaction Temp. °C. | Catalyst | Catalyst Weight Ratio Catalyst/Reactants |
|---|---|---|---|---|---|
| 1 | LAB | 1/7 | 10 | $H_2SO_4$ | 1/6 |
| 2 | LAB | 1/4 | 10 | $H_2SO_4$ | 1/7 |
| 3 | LAB | 1/2 | 10 | $CF_3SO_3H$ | 1/100 |
| 4 | LAB | 1/2 | 45 | $H_2SO_4$ | 1/9 |
| 5 | BAT | 1/2 | 10 | $H_2SO_4$ | 1/21 |
| 6 | BAT | 2.5/1 | 10 | $H_2SO_4$ | 1/21 |
| 7 | DBAB | 2.5/1 | 10 | $H_2SO_4$ | 1/70 |
| 8 | BAT | 1/1 | 10 | $H_2SO_4$ | 1/28 |
| 9 | LAB | 1/1 | 100 | $H_2SO_4$ | 1/10 |
| 10 | BAT | 1/1 | 30 | $H_2SO_4$ | 1/28 |
| 11 | BAB | 1/1 | 10 | $H_2SO_4$ | 1/9 |
| 12 | BAB | 2.5/1 | 10 | $H_2SO_4$ | 1/60 |
| 13 | LAB | 1/2 | 30 | $H_2SO_4$ | 1/7 |
| 14 | LAB | 1/2 | 100 | $H_2SO_4$ | 1/7 |
| 15 | LAB | 1/2 | 145 | $H_3PO_4$ | 1/7 |
| 16 | LAB | 5/1 | 125 | $CF_3SO_3H$ | 1/480 |

TABLE B

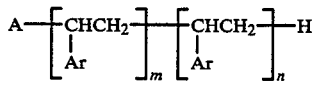

| | Sulfonation Conditions | | Average Product Composition | | |
|---|---|---|---|---|---|
| Comp. No. | Weight Ratio to $SO_3$ Polymer Reaction Product | Reaction Temp. °C. | Alkyl- benzene | Mole Ratio Alkyl- benzene/ Styrene | % Sulfona- tion* |
| 1 | 0.8 | 10 | LAB*1 | 1/7 | 90 |
| 2 | 0.8 | 10 | LAB | 1/4 | 90 |
| 3 | 0.7 | 10 | LAB | 1/2 | 90 |
| 4 | | | | | |
| 5 | 0.6 | 10 | BAT*2 | 1/2 | 90 |
| 6 | 0.6 | 10 | BAT | 2.5/1 | 90 |
| 7 | 0.4 | 10 | di(BAT) | 2.5/1 | 90 |
| 8 | 0.6 | 10 | BAT | 1/1 | 90 |
| 9 | 0.6 | 10 | BAT | 1/1 | 90 |
| 10 | 0.7 | 10 | BAB*3 | 1/1 | 90 |
| 11 | 0.5 | 10 | BAB | 1/1 | 90 |
| 12 | 0.5 | 10 | BAB | 2.5/1 | 90 |
| 13 | 0.7 | 10 | LAB | 1/2 | 90 |
| 14 | 0.7 | 10 | LAB | 1/2 | 90 |
| 15 | 0.7 | 10 | LAB | 1/2 | 90 |
| 16 | 0.6 | 10 | LAB | 5/1 | 90 |

*1 LAB = $C_{10}$ to $C_{15}$ linear alkylbenzene
*2 BAT = $C_{15}$ to $C_{18}$ branched alkyltoluene
*3 BAB = $C_{10}$ to $C_{15}$ branched alkylbenzene
*% Sulfonation = % of aromatic rings sulfonated
A is alkylphenyl or 3-phenylindanylmethyl

Example 4

The polymers were evaluated for detergency by measuring surface tension and interfacial tension according to standard procedures. Surface tension and interfacial tension are indicative of detergent properties. The lower the surface tension and interfacial tension, the better the detergent or cleaning properties. Solubility was also measured using the clear point technique. The clear point is a standard test used in measuring detergent solubility and measures the temperature at which a given concentration of the test composition clears. The lower the clear point, the better the solubility.

Surface tension (i.e., liquid to air) and interfacial tension (i.e., liquid to liquid) were determined using the procedures described in ASTM D971, "Interfacial Tension of Oil Against Water by the Ring Method". Surface tension is measured by placing a vessel containing an aqueous solution of the test detergent at a standard concentration on the platform of the tensiometer over which a plantinum ring of very thin wire is placed. The platform is raised until the ring is properly immersed and centered in the liquid and surface tension measured. Interfacial tension is determined by pouring a lighter immiscible liquid (typically a hydrocarbon) onto the surface of a heavier liquid (i.e., the aqueous solution of the test detergent) to a depth of about ¼–½ in. The ring is positioned at the interface of the two liquids and tension (i.e., interfacial tension) is measured. In each test, tension is measured after the interface is allowed to equilibrate for one minute. The force necessary to pull the platinum ring across the interface is then measured, and the force is converted, using the density(ies) of the liquid(s), to a surface or interfacial tension. Results are reported as dynes/cm. The lower the tension, the better the detergency.

The present tests were conducted at 25° C. using an 0.8 weight percent solution of the test composition in water. In the interfacial tension tests decane was used as the immiscible liquid. A control (i.e., a nonsurfactant) was also tested for reference purposes.

The results of these tests are shown in Table C hereinbelow.

TABLE C

| Composition No. | Surface Tension dynes/cm | Interfacial Tension dynes/cm |
|---|---|---|
| 1 | — | — |
| 2 | 32 | 2.4 |
| 3 | — | — |
| 4 | — | — |
| 5 | 26 | 1.0 |
| 6 | — | — |
| 7 | 29 | 1.6 |
| 8 | 25 | 1.1 |

TABLE C-continued

| Composition No. | Surface Tension dynes/cm | Interfacial Tension dynes/cm |
|---|---|---|
| 9 | — | — |
| 10 | 28 | 1.1 |
| 11 | 30 | 2.2 |
| 12 | 28 | 2.9 |
| 13 | 30 | 1.1 |
| 14 | 30 | 1.4 |
| 15 | — | — |
| 16 | — | — |
| Control | 72 | 50 |

Example 5

In this example, the clear point of Applicant's detergent composition indicated as Composition 14 in Tables A and B hereinabove was determined and compared with the clear point of the corresponding sodium alkylbenzene sulfonate which was prepared using the same alkylbenzene as was used in the polymerization to prepare Applicant's polymer composition. The composition of the present invention had a sodium sulfate content of 2.9 weight percent. The comparison sulfonated alkylbenzene also had a sodium sulfonate content of 2.9 weight percent. As before mentioned, clear point is the temperature at which a cloudy aqueous solution of the detergent clears. This is a standard test used in the detergent industry to evaluate the relative solubility of detergents at a given concentration.

The detergent composition of the present invention had a clear point of 17° C. at a concentration of 13.8 weight percent. At the same concentration and sodium sulfate content, the alkylbenzene detergent had a clear point of 33° C. Accordingly, the composition of the present invention was significantly more soluble for detergent purposes than the sodium alkylbenzene sulfonate composition from the same alkylbenzene.

What is claimed is:

1. A compound having the formula:

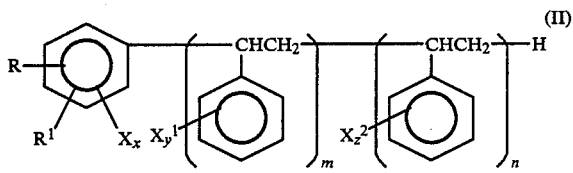
(II)

wherein m and n are independently a whole integer of from 1–10;
one of R or $R^1$ is hydrogen or alkyl having 9–30 carbon atoms and the other is alkyl having 9–30 carbon atoms;
X, $X^1$ and $X^2$ are independently selected from radicals having the formula —$SO_3M$ wherein M is hydrogen or a detergent acceptable cation and y and z are independently 0 or a whole integer of 1–10 and respectively represent the number of —$SO_3M$ units in the polymer units m and n; and wherein said —$SO_3M$ groups are attached to the phenyl moieties of said polymer units and wherein said phenyl moieties individually have 0 or 1 —$SO_3M$ substituent;
x is 0 or 1 with the proviso that the sum of x, y and x, is at least 1.

2. The compound of claim 1 of Formula II.

3. The compound of claim 2 wherein one of R or $R^1$ is alkyl having 9–18 carbon atoms and the other is hydrogen or alkyl having 9–18 carbon atoms.

4. The compound of claim 3 wherein said alkyl is a straight chain or monobranched alkyl group.

5. The compound of claim 3 wherein R is alkyl and $R^1$ is hydrogen.

6. The compound of claim 5 wherein R is a straight chain or monobranched alkyl group, having 9–18 carbon atoms.

7. The compound of claim 6 wherein R is an alkyl group having 10–12 carbon atoms.

8. The compound of claim 2, wherein M is a detergent acceptable cation.

9. The compound of claim 8 wherein M is a sodium cation.

10. The compound of claim 8 wherein one of R or $R^1$ is an alkyl group having 9–18 carbon atoms and the other is hydrogen or an alkyl group having 9–18 carbon atoms.

11. The compound of claim 10, wherein R is hydrogen.

12. The compound of 11, wherein $R^1$ is alkyl having 12 carbon atoms.

13. The compound of claim 2, wherein M is hydrogen.

14. A detergent composition comprising a detergent effective amount of a compound according to claim 8 or mixtures thereof and a water-soluble detergent builder.

15. A detergent composition comprising a compound according to claim 8 or mixtures thereof and a detergent alkylbenzene sulfonate salt selected from the group having the formula

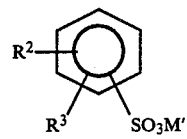

wherein M' is a detergent acceptable salt and one of $R^2$ or $R^3$ is alkyl having 9–30 carbon atoms and the other is hydrogen or alkyl having 9–30 carbon atoms;
and mixtures thereof.

16. A detergent composition comprising about 20–90 weight percent of a compound according to claim 8 or mixtures thereof and about from 10–80 weight percent of a detergent alkylbenzene selected from the group having the formula:

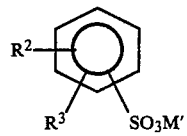

wherein M' is a detergent acceptable salt and one of $R^2$ or $R^3$ is alkyl having 9–30 carbon atoms and the other is hydrogen or alkyl having 9–30 carbon atoms;
and mixtures thereof.

17. The detergent composition of claim 15 wherein said composition comprises a compound selected from the group having the formula:

and mixtures thereof and 10–40 weight percent of a compound selected from the group having the formula:

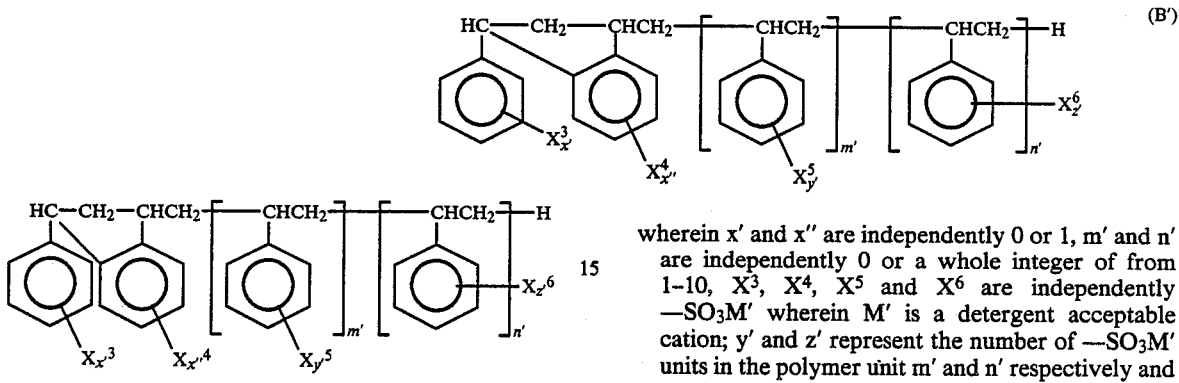

(B')

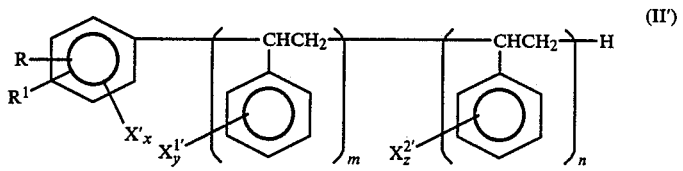

wherein x' and x" are independently 0 or 1, m' and n' are independently 0 or a whole integer of from 1–10, $X^3$, $X^4$, $X^5$ and $X^6$ are independently —$SO_3M'$ wherein M' is a detergent acceptable cation; y' and z' represent the number of —$SO_3M'$ units in the polymer unit m' and n' respectively and are independently 0 or a whole integer of from 1–10 with the proviso that the number of —$SO_3M'$ substituents on any one phenyl ring within said polymer unit is 0 or 1 and the sum of x, x', y' and z' is at least 1; and mixtures thereof.

wherein x' and x" are independently 0 or 1, m' and n' are independently 0 or a whole integer of from 1–10, $X^3$, $X^4$, $X^5$ and $X^6$ are independently —$SO_3M^{40}$ wherein M' is a detergent acceptable cation; y' and z' are independently 0 or a whole integer of from 1–10 and represent the number of —$SO_3M'$ units in the polymer unit m' and n' respectively, with the proviso that the number of —$SO_3M'$ substituents on any one phenyl ring within said polymer unit is 0 or 1 and the sum of x, $x^{40}$, y' and z' is at least 1; and mixtures thereof.
and mixtures thereof.

19. A detergent composition comprising an alkylbenzene-styrene polymer selected from the group having the formula:

(II')

18. A detergent composition comprising 30–80 weight percent of a compound according to claim 8 or mixtures thereof; 10–50 weight percent of a detergent alkylbenzene sulfonate salt selected from the group having the formula:

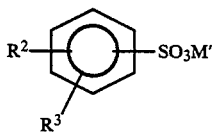

wherein M' is a detergent acceptable salt and one of $R^2$ or $R^3$ is alkyl having 9–30 carbon atoms and the other is hydrogen or alkyl having 9–30 carbon atoms wherein m and n are independently a whole integer of from 1–10;
one of $R^1$ or $R^2$ is hydrogen or alkyl having 9–18 carbon atoms and the other is alkyl having 9–18 carbon atoms;
X', $X^{1'}$ and $X^{2'}$ are independently selected from radicals having the formula —$SO_3M'$ wherein M' is a detergent acceptable cation; y and z are independently 0 or 1–10 and respectively represent the number of —$SO_3M$ groups in the polymer units m and n, respectively; and x is 0 or 1 with the proviso that the number of —$SO_3M'$ substituents on any one phenyl ring within said polymer units is 0 or 1 and the sum of X, y and z is at least 1;
and mixtures thereof and an indane derivative selected from the group having the formula:

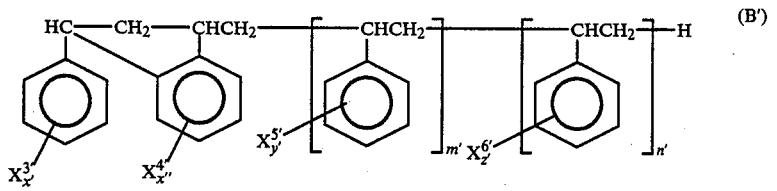

(B')

wherein x' and x" are independently 0 or 1; m' and n' are independently 0 or a whole integer of from 1–10 and $X^{3'}$, $X^{4'}$, $X^{5'}$ and $X^{6'}$ are independently —$SO_3M'$ wherein M' is a detergent acceptable cation and y' and z' are independently 0 or a whole integer of from 1–10 and represent the number of —$SO_3M'$ units n the polymer unit m' and n' respectively with the proviso that the number of —SO₃M substituents on any one phenyl ring is 0 or 1 and the sum of x', x", y' and z' at least 1.

20. The composition of claim 19 wherein said composition comprises about from 30-80 weight percent of said alkylbenzene-styrene copolymer and about from 20-70 weight percent of said indane derivative.

21. The composition of claim 19 wherein said composition comprises about from 30-80 weight percent of said alkylbenzene-styrene copolymer and about from 10-50 weight percent of said indane derivative and about from 10-40 weight percent of a sulfonate alkylbenzene salt selected from the group having the formula:

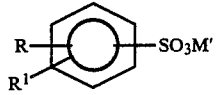

wherein M' is a detergent acceptable cation and one of R or R¹ is hydrogen or alkyl having 9-30 carbon atoms and the other is alkyl having 9-30 carbon atoms,
and mixtures thereof.

22. A detergent composition comprising about from 30-70 weight percent of an indane derivative selected from the group having the formula:

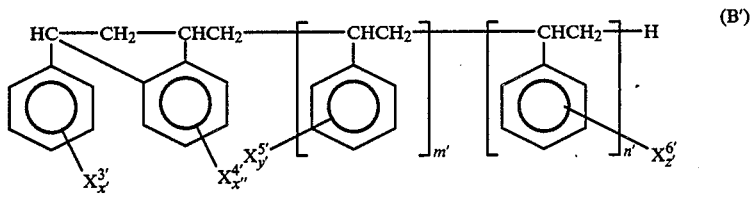

wherein x' and x" are independently 0 or 1;
m' and n' are independently 0 or a whole integer of from 1-10;
X³', X⁴', X⁵' and X⁶' are independently —SO₃M' wherein M' is a detergent acceptable cation; and
y' and z' are independently 0 or a whole integer of 1-10 and represent the number of —SO₃M' groups in the polymer units m' and n' respectively, with the proviso that the number of —SO₃M' on any one phenyl ring within said polymer unit is 0 or 1 and the further proviso that the sum of x', x", y' and z' is at least 1;
and mixtures thereof and about from 30-70 weight percent of a detergent alkylbenzene sulfonate selected from the group having the formula:

wherein R is hydrogen or alkyl having 9-30 carbon atoms, R¹ is alkyl having 9-30 carbon atoms and M' is as defined hereinabove;
and mixtures thereof.

23. A process for preparing a detergent active composition which comprises the steps of
(a) contacting a C₉-C₃₀ alkylbenzene with styrene in the presence of an acid catalyst under polymerization conditions thereby producing a reaction product comprising copolymers of said alkylbenzene and styrene;
(b) contacting the reaction product of step (a) with a sulfonating agent under reactive conditions thereby sulfonating at least a portion of said reaction product of steps (a); and
(c) neutralizing the sulfonated reaction product with a detergent acceptable cation base to produce detergent acceptable sulfate salts.

24. The process of claim 23 wherein said sulfonating reaction of step (c) is conducted in the presence of a moderating agent to reduce the intensity of the reaction.

25. The process of claim 24 wherein said moderating agent is dioxane.

26. The process of claim 23 wherein said base used in step (c) is sodium hydroxide.

27. The process of claim 26 wherein step (a) is conducted at temperatures in the range of about from 40 to 100° C. using about from ¼ to 5 moles of styrene per mole of said alkylbenzene and step (b) is conducted at temperatures in the range of about from 0° to 50° C. using about from 1 to 1.25 moles, based on sulfur content, of sulfonating agent per mole of said alkylbenzene and said styrene used in step (a).

28. The process of claim 26 wherein said acid catalyst is selected from the group of sulfuric acid and trifluoromethylsulfonic acid.

29. The product of the process of claim 23.

30. The product of the process of claim 28.

31. A process for preparing a detergent-active composition which comprises the steps of
a. contacting a C₉-C₃₀ alkylbenzene with styrene in the presence of phosphoric acid as catalyst under polymerization conditions at temperatures in the range of about from 40° to 100° C. using about from ¼ to 5 moles of styrene per mole of said C₉-C₃₀ alkylbenzene to produce a reaction product mixture comprising unreacted C₉-C₃₀ alkylbenzene and an indane derivative or mixture thereof having the formula:

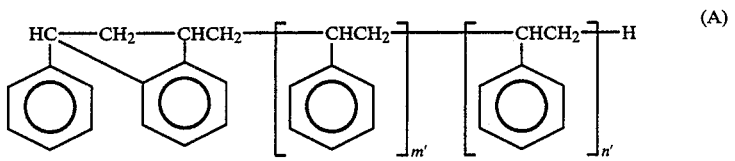

wherein m′ and n′ are independently 0 or a whole integer of from 1–10;

b. contacting the reaction product of step a. with a sulfonating agent under reactive conditions at temperatures in the range of about from 0° to 50° C. using about from 1 to 1.25 moles, based on sulfur, of said sulfonating agent per mole of said alkylbenzene and styrene used in step a. thereby sulfonating said reaction product of step a.; and c. neutralizing the sulfonated reaction product with a detergent acceptable cation base to produce detergent acceptable sulfate salts.

32. The product of the process of claim 31.

* * * * *